Patented June 8, 1943

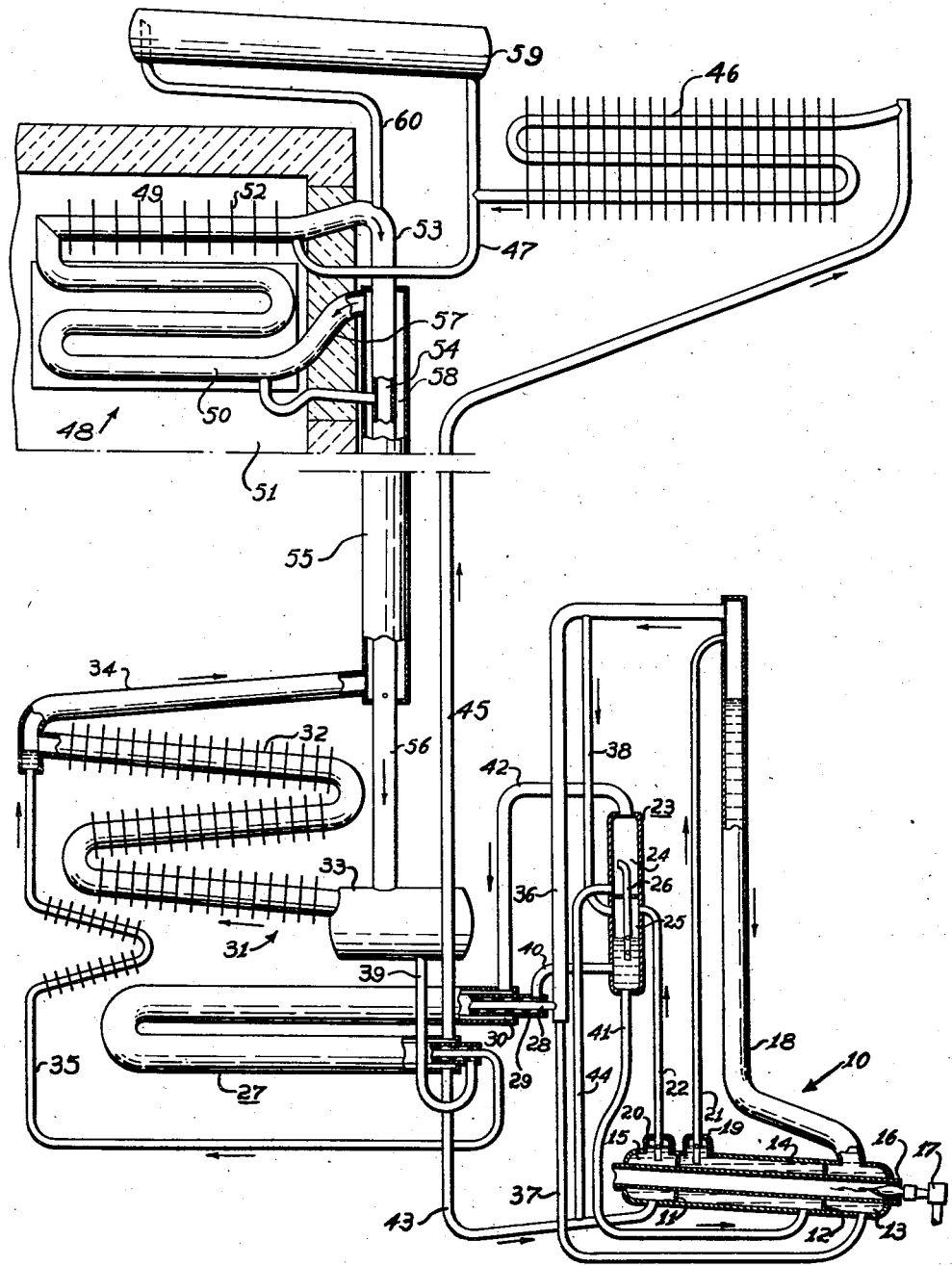

2,321,060

UNITED STATES PATENT OFFICE 2,321,060

REFRIGERATION

Carl T. Ashby, Evansville, Ind., assignor to Servel, Inc., New York, N. Y., a corporation of Delaware Application September 16, 1941, Serial No. 410,978

11 Claims. (Cl. 62—119.5)

My invention relates to diffusion type absorption refrigeration systems and it is an object of the invention to provide such a system in which fluid circulation is so carried out that rectification of refrigerant vapor is effected both in the presence of and out of contact with absorption liquid, and raising of rectification condensate to a higher level for return to the solution circuit is effected without local corrosion of apparatus parts.

The single figure of the drawing shows more or less diagrammatically a refrigeration system embodying the invention. This system is generally like those systems shown and described in Patent No. 2,257,874 of H. M. Ullstrand and my Patent No. 2,251,314, and the disclosures of said patents are hereby incorporated in this specification.

Referring to the drawing, a generator 10 has a horizontal portion divided by partitions 11 and 12 into chambers 13, 14 and 15. A flue 16 projects through the three chambers, 13, 14 and 15. A gas burner 17 is arranged so that its flame is projected into the lower end of flue 16 so that heat from the burner is transmitted through the flue to the three chambers, 13, 14, and 15. Any other suitable means for applying heat to the generator 10 may be used, as for instance, an electric heating element or liquid fuel burner. The generator 10 also includes a standpipe 18. The lower end of standpipe 18 is connected to the top of chamber 13. Chambers 14 and 15 are provided with small domes 19 and 20. The lower ends of vapor-lift conduits 21 and 22 project into chambers 14 and 15 through domes 19 and 20, respectively. The upper end of vapor-lift conduit 21 is connected to the upper end of standpipe 18.

An analyzer 23 is like that shown and described in U. S. Patent 2,169,214 of H. K. Bergholm. Reference to this patent should be made for a detailed description of this analyzer. Briefly, analyzer 23 has an upper chamber 24 and a lower chamber 25. A short vapor-lift conduit 26 has its lower end projecting downward into chamber 25, and its upper end projecting upward into chamber 24. The upper end of vapor-lift conduit 22 is connected to the upper part of analyzer chamber 25.

A heat exchanger 27 has an inner passage 28, a middle passage 29, and an outer passage 30. Heat exchanger 27 is located above the horizontal part of generator 10 and below an absorber 31.

Absorber 31 comprises a finned pipe coil 32 at the lower end of which is connected a vessel 33. The upper end of the absorber coil 32 is connected to a conduit 34. The lower end of conduit 34 is connected by a conduit 35 at one end of the inner heat exchange passage 28. The other end of passage 28 is connected to a conduit 36. The upper end of conduit 36 is connected to the top of generator standpipe 18. The lower end of conduit 36 is connected by a conduit 37 to generator chamber 13. The upper part of conduit 36 is connected by a conduit 38 to the upper part of analyzer chamber 25.

The absorber vessel 33 is connected by a conduit 39 to one end of the middle heat exchanger passage 29. The other end of this passage is connected by a conduit 40 to the lower analyzer chamber 25. The bottom of this chamber is connected by a conduit 41 to generator chamber 14.

The top of analyzer chamber 24 is connected by a conduit 42 to one end of the outer heat exchanger passage 30. The other end of this passage is connected by a conduit 43 to generator chamber 15. Conduit 43 is also connected by way of a conduit 44 to the lower part of the upper analyzer chamber 24.

The lower end of outer heat exchanger passage 30 is connected by a conduit 45 to the upper end of an air cooled condenser 46. The lower end of condenser 46 is connected by a conduit 47 to the upper part of an evaporator 48. The evaporator 48 is shown as a pipe coil having an upper part 49 and a lower part 50. The evaporator is located in a thermally insulated storage compartment 51. The upper evaporator part 49 is provided with heat transfer fins 52 for cooling of air in compartment 51. The lower evaporator part 50 may be arranged for freezing of water, or the like, in known manner.

The upper end of evaporator 48 is connected by a conduit 53, an inner passage 54 of a gas heat exchanger 55, and a conduit 56 to absorber vessel 33. The lower end of evaporator 48 is connected by a conduit 57, outer passage 58 of the heat exchanger 55, and conduit 34 to the upper end of absorber coil 32.

One end of a gas storage vessel 59 is connected to the upper end of conduit 47. The other end of vessel 59 is connected by a conduit 60 to conduit 53.

The described system of conduits and vessels is evacuated and then charged with a solution of refrigerant in an absorption liquid, and an auxiliary inert fluid such as hydrogen gas. The solution may be, for instance, a 30% solution of ammonia and water with which the system is filled to a level just below the connection of absorber coil 32 to absorber vessel 33. The gas is charged into the system at such a pressure that the total pressure in the system will be the condensing temperature of ammonia at a fairly high room temperature. After charging, the system is hermetically sealed.

The system is operated by lighting the burner 17. This burner may be controlled thermostatically responsive, for instance, to a temperature condition affected by evaporator 48. Upon application of heat to generator 10, ammonia vapor is expelled from solution in generator chambers 13, 14, and 15. Vapor expelled in chamber 13 bubbles upward through liquid and reaches the top standpipe 18. Vapor expelled from solution in chamber 14 flows upward through conduit 21 and in known manner carries with it liquid from chamber 14 into the upper end of standpipe 18. Vapor expelled from solution in chamber 15 rises through conduit 22 and in known manner carries with it liquid from chamber 15 into the lower analyzer chamber 25.

Vapor from the upper end of standpipe 18 flows through conduits 36 and 38 into the lower analyzer chamber 25. The vapor introduced into chamber 25 from conduits 22 and 38 flows upward through conduit 26 carrying with it liquid from chamber 25 into upper chamber 24.

Vapor flows from analyzer chamber 24 through conduit 42, heat exchanger passage 30, and conduit 45 to condenser 46. Refrigerant vapor is condensed to liquid in condenser 46. The condensed liquid flows from condenser 46 through conduit 47 into evaporator 48. The liquid refrigerant flows downward in evaporator 48 and evaporates and diffuses into the hydrogen, producing the refrigerating effect for freezing water and cooling air in compartment 51.

The resulting mixture of ammonia vapor and hydrogen gas flows from the evaporator through conduit 53, gas heat exchanger 55, and conduit 56 to the absorber 31. The vapor and gas mixture flows upward through absorber 31 and the ammonia vapor is absorbed into absorption liquid which enters the upper end of absorber coil 32. The hydrogen gas, from which ammonia vapor has been absorbed (weak gas), flows from the upper end of absorber 31 through conduit 34, gas heat exchanger 55, and conduit 57 back to the evaporator 48.

The absorption liquid which entered the upper end of absorber coil 32 was received from generator chamber 13 (weak liquid chamber) by way of conduit 37, the lower end of conduit 36, inner passage 28 of heat exchanger 27, conduit 35, and the lower end of conduit 34. The weak absorption liquid flows downwardly in absorber coil 32 into absorber vessel 33. Due to absorption of ammonia in the absorber, the absorption liquid becomes enriched in ammonia and the resulting rich or strong solution flows from the absorber through conduit 39, heat exchanger 27, conduit 40, analyzer 23, and conduit 41 to generator chamber 14 (strong solution chamber).

The flow of absorption liquid in the described circuit takes place due to the fact that liquid is raised through conduit 21 by vapor-lift action from the generator strong solution chamber 14 to the upper end of standpipe 18 in which liquid reaches such a level that flow through the remainder of the circuit takes place by gravity.

Vapor passing upward through tube 26 in analyzer 23 comes into intimate physical contact with enriched absorption liquid flowing toward the generator. The vapor and liquid tend to reach equilibrium, resulting in condensation of water vapor and expulsion from solution of ammonia vapor. Vapor flowing in the outer passage 30 of heat exchanger 27 becomes further cooled by heat transfer to solution flowing in the middle passage 29. This cooling produces further condensation of water vapor. This condensed water, which is actually very strong solution, drains from the outer heat exchanger passage 30 into conduit 43 and flows through this conduit into chamber 15. Thus, after operation of the system over a length of time, chamber 15 would contain only condensate. This does not occur, however, because solution from upper analyzer chamber 24 flows through conduit 44 and joins condensate in conduit 43. The reason for this provision is to inhibit corrosion in the path of flow of condensate from chamber 15 to analyzer 23. In charging the system, it is usual to include a small quantity of corrosion inhibiting substance such as sodium or potassium chromate or bichromate. This substance becomes diffused throughout liquid in the liquid circuit, but is separated from vapors in the circuit by distillation. Thus there is no corrosion inhibiting substance in the condensate flowing through conduit 43 to the generator vessel 15. However, solution flowing through conduit 44 contains corrosion inhibiting material and this solution is mixed with the condensate entering heated chamber 15.

Vessel 59 serves as a storage vessel for a reserve quantity of hydrogen which is displaced therefrom through conduit 60 into the evaporator-absorber gas circuit upon increase in pressure so that refrigeration continues at the higher pressure. The vapor from generator standpipe 18 need not pass through analyzer 23 but could be conducted directly to the rectifier passage 30 of heat exchanger 27, leaving a vapor from the lift conduit 22 to produce the flow of solution through the short vapor-lift conduit 26 in analyzer 23.

Various other changes and modifications may be made within the scope of the invention as set forth in the following claims.

What is claimed is:

1. A refrigeration system including an evaporator, an absorber, a gas circuit including said evaporator and absorber, a condenser for supplying liquid refrigerant to said evaporator, a generator for supplying refrigerant vapor to said condenser, and a liquid circuit including said generator and absorber, said liquid circuit also including an analyzer, said analyzer being of a type in which vapor comes into contact with absorption liquid while raising the liquid by vapor lift action, a rectifier for vapor flowing to said condenser, said rectifier being located at a level below the surface level of liquid in said analyzer, and a lift for raising condensate from said rectifier to said analyzer.

2. An absorption refrigeration system including a generator, an absorber, an analyzer having a lower chamber and an upper chamber, members including said analyzer for circulation of absorption liquid between said generator and said absorber, a vapor liquid lift conduit connecting said lower chamber to said upper chamber, a conduit for vapor from said generator to said lower chamber whereby vapor is introduced into said lower chamber to raise liquid therein to said lift conduit into said upper chamber, a rectifier located at a level below said analyzer, and a vapor liquid lift for raising condensate from said rectifier into the lower chamber of said analyzer.

3. An absorption refrigeration system including a generator, an absorber, an analyzer comprising a vessel having an upper chamber and a lower chamber and a vapor lift conduit for liquid from said lower to said upper chambers, a rectifier cooled by liquid flowing between said absorber and generator, and a vapor liquid lift for raising the condensate from said rectifier into the lower chamber of said analyzer.

4. An absorption refrigeration system having a liquid circuit including a generator, an absorber, an analyzer, and a liquid heat exchanger, a rectifier cooled by heat transfer to liquid in said heat exchanger, said liquid circuit also including a vapor liquid lift for causing circulation of liquid in said circuit, a second vapor liquid lift forming part of said analyzer, and a third vapor lift for raising condensate from said rectifier into said analyzer.

5. An absorption refrigeration system having a liquid circuit including a generator and an absorber, a rectifier cooled by liquid in said circuit, a conduit through which condensate flows from said rectifier into said liquid circuit, and a conduit for introducing liquid from said circuit into said condensate conduit.

6. An absorption refrigeration system having an absorption liquid circuit, a rectifier cooled by heat transfer to liquid in said circuit, a vapor lift for raising condensate from said rectifier, and a conduit for withdrawing absorption liquid from said circuit and joining the withdrawn liquid with condensate from said rectifier before flow of said condensate through said vapor lift.

7. An absorption refrigeration system having an absorption liquid circuit, a rectifier cooled by liquid from said circuit, a vapor lift for raising condensate from said rectifier, and a conduit for withdrawing liquid from said circuit and introducing the liquid into said condensate before flow of the latter through said vapor lift, said conduit including a second vapor liquid lift.

8. An absorption refrigeration system having an absorption liquid circuit, a rectifier cooled by liquid in said circuit, a vapor lift for raising condensate from said rectifier, a second vapor lift for withdrawing absorption liquid from said circuit for mixing with said condensate before flow through said first vapor lift, said second vapor lift also forming an analyzer.

9. In a method of refrigeration which includes flowing absorption liquid in a circuit and expelling refrigerant vapor from the liquid in one part of the circuit, and absorbing refrigerant vapor into the liquid in another part of the circuit, that improvement which consists in rectifying expelled vapor by heat transfer to liquid in said circuit, the raising of the condensate by vapor lift action for return to the liquid circuit, and withdrawing some liquid from said circuit and mixing withdrawn liquid with said condensate before subjecting the latter to said vapor lift action.

10. In a method of refrigeration which includes flowing absorption liquid in a circuit and expelling refrigerant vapor from solution in the liquid in one part of the circuit, and absorbing refrigerant vapor into solution in the liquid in another part of the circuit, the improvement which consists in rectifying the expelled vapor by heat transfer to liquid in said circuit, raising the resulting condensate by vapor lift action for return to the liquid circuit, utilizing vapor lift action to withdraw some liquid from said circuit, and mixing the withdrawn liquid with said condensate before subjecting the latter to said first vapor lift action.

11. In a method of refrigeration which includes circulating absorption liquid in a circuit and expelling refrigerant vapor from the liquid in one part of the circuit, and absorbing refrigerant vapor into solution with the liquid in another part of the circuit, rectifying expelled vapor by heat transfer to liquid in the circuit, raising the resulting condensate by vapor lift action for return into the circuit, utilizing vapor lift action for withdrawing some liquid from said circuit, mixing the withdrawn liquid with said condensate before subjecting the latter to said first vapor lift action, and utilizing expelled vapor for said second vapor lift action.

CARL T. ASHBY.